2,711,987

INSECT TOXICANT REACTION PRODUCT OF HYDROXYAROMATIC AND ALKALI ORTHOSILICATE COMPOUNDS

Frank H. Lyons, Memphis, Tenn., assignor to E. L. Bruce Company, Memphis, Tenn., a corporation of Delaware No Drawing. Application March 23, 1954,
Serial No. 418,240

3 Claims. (Cl. 167—31)

This invention relates to a new chemical composition which has particular utility as an insect toxicant. More particularly, the composition in accordance with this invention is an aqueous solution of a new toxicant compound.

The chemical composition in accordance with this invention is advantageous due to the fact that it possesses a high degree of toxicity. Being an aqueous solution it is economical and facile to apply. It may be used, for example, for controlling and destroying wood destroying insects, as, for example, subterranean termites, or the like.

As further illustrative of the utility of the composition of this invention, it is advantageous since the toxicant compound reacts with lime to form an insoluble toxicant compound. This is highly useful for treating, for example, Portland cement slabs used in housing construction. The composition can be readily applied to the slab and there is formed an insoluble toxicant which will not be leached away by water.

More specifically, the composition in accordance with this invention is formed by the reaction in an aqueous medium of hydrated sodium orthosilicate with a naphthol, such as, for example, beta naphthol, phenol, a halogen substituted phenol, such as pentachlorophenol or tetrachlorophenol, cresol, a halogen substituted cresol, anthrols, and hydroxy substituted phenols, the reaction being carried out in the ratio of 1 mol of hydrated sodium orthosilicate to from 1 to 3 mols of one or more of the above listed reactants. In the final product the toxicant compound is about 2% to about 20% by weight of the water.

The actual structure of hydrated sodium orthosilicate and the actual structure of the reaction products of this invention are not known. The formulas provided herein are, therefore, to be considered essentially empirical.

The compounds are readily prepared by mixing anhydrous sodium orthosilicate with water, the reaction being shown below:

$$(Na_2O)_2SiO_2 + 2H_2O \rightarrow (NaOH)_4SiO_2$$

To a dilute aqueous solution containing the hydrated sodium orthosilicate there is added the selected reactant, i. e., for example, beta naphthol or a phenol in the appropriate molar proportion to form the desired compound. During the reaction it is desirable to stir the reaction mass. The reaction is complete when all the material is in solution.

The invention will further be illustrated by the following examples:

EXAMPLE 1

Aqueous solution of sodium orthosilicate-beta naphthol reaction product formed from the ratio of 1 mol of hydrated sodium orthosilicate to 1 mol of beta naphthol 164 pounds of water were placed in a vessel and 21 pounds of sodium orthosilicate, 89% pure, were added and stirred until in solution. 15 pounds of beta naphthol were added and stirred until the reaction was complete.

EXAMPLE 2

Aqueous solution of sodium orthosilicate-beta naphthol reaction product formed from the ratio of 2 mols of hydrated sodium orthosilicate to 3 mols of beta naphthol 171 pounds of water were placed in a vessel and 14 pounds of sodium orthosilicate, 89% pure, were added and stirred until in solution. 15 pounds of beta napthol were added and stirred until the reaction was complete.

EXAMPLE 3

Aqueous solution of sodium orthosilicate-beta naphthol reaction product formed from the ratio of 1 mol of hydrated sodium orthosilicate to 3 mols of beta naphthol 178 pounds of water were placed in a vessel and 7 pounds of sodium orthosilicate, 89% pure, were added and stirred until in solution. 15 pounds of beta naphthol were added and stirred until the reaction was complete.

EXAMPLE 4

Aqueous solution of sodium orthosilicate-pentachlorophenol reaction product formed from the ratio of 1 mol of hydrated sodium orthosilicate to 1 mol of pentachlorophenol 164 pounds of water were placed in a vessel and 11½ pounds of sodium orthosilicate, 89% pure, were added and stirred until in solution. 15 pounds of pentachlorophenol were added and stirred until the reaction was complete.

EXAMPLE 5

Aqueous solution of sodium orthosilicate-pentachlorophenol reaction product formed from the ratio of 1 mol of hydrated sodium orthosilicate to 2 mols of pentachlorophenol 171 pounds of water were placed in a vessel and 7.7 pounds of sodium orthosilicate, 89% pure, were added and stirred until in solution. 15 pounds of pentachlorophenol were added and stirred until the reaction was complete.

EXAMPLE 6

Aqueous solution of sodium orthosilicate-tetrachlorophenol reaction product formed from the ratio of 1 mol of hydrated sodium orthosilicate to 2 mols of tetrachlorophenol 171 pounds of water were placed in a vessel and 7.7 pounds of sodium orthosilicate, 89% pure, were added and stirred until in solution. 15 pounds of tetrachlorophenol were added and stirred until the reaction was complete.

EXAMPLE 7

Aqueous solution of sodium orthosilicate-beta naphthol-pentachlorophenol reaction product formed from the ratio of 1 mol of hydrated sodium orthosilicate to 1 mol of beta naphthol and 1 mol of pentachlorophenol 328 pounds of water were placed in a vessel and 32½ pounds of sodium orthosilicate, 89% pure, were added and stirred until in solution. 15 pounds of beta naphthol and 15 pounds of pentachlorophenol were added and stirred until the reaction was complete.

EXAMPLE 8

Sodium orthosilicate-pentachlorophenol reaction product formed from the ratio of 1 mol of hydrated sodium orthosilicate to 3 mols of pentachlorophenol 178 pounds of water were placed in a vessel and 3.85 pounds of sodium orthosilicate, 89% pure, were added and stirred until in solution. 15 pounds of pentachlorophenol were added and stirred until the reaction was complete.

To further illustrate the utility of these compounds when used in connection with a cement containing lime, the reaction of the betal naphthol-hydrated sodium orthosilicate reaction product with lime to form an insoluble toxicant is illustrated below:

ous solution of the reaction product of hydrated sodium orthosilicate with beta naphthol, the hydrated sodium orthosilicate and the beta naphthol being reacted in the ratio of from 1 mol of hydrated sodium orthosilicate to from 1 to 3 mols of beta naphthol.

3. An insect toxicant composition comprising an aqueous solution of the reaction product of hydrated sodium

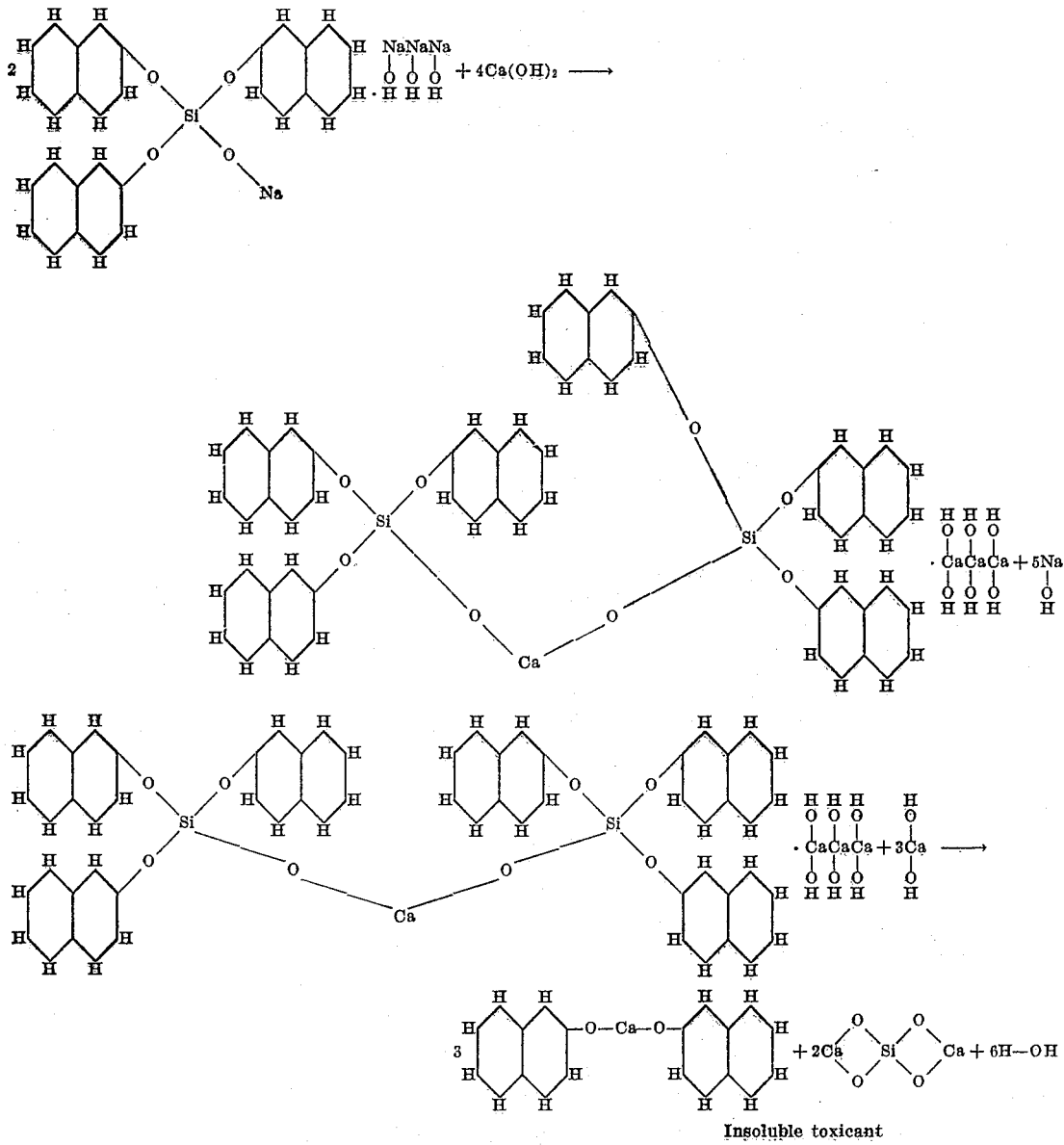

Insoluble toxicant

What is claimed is:

1. An insect toxicant composition comprising an aqueous solution of the reaction product of hydrated sodium orthosilicate with a member selected from the group consisting of beta naphthol, phenol, a halogen substituted phenol, cresol, a halogen substituted cresol, anthrols, and hydroxy substituted phenols, the hydrated sodium orthosilicate and said member being reacted in the ratio of from 1 mol of hydrated sodium orthosilicate to from 1 to 3 mols of said member.

2. An insect toxicant composition comprising an aqueous orthosilicate with pentachlorophenol, the hydrated sodium orthosilicate and the pentachlorophenol being reacted in the ratio of from 1 mol of hydrated sodium orthosilicate to from 1 to 3 mols of pentachlorophenol.

References Cited in the file of this patent

UNITED STATES PATENTS

| 2,224,815 | Glycofrides | Dec. 10, 1940 |
| 2,335,012 | Johnston | Nov. 23, 1943 |
| 2,485,366 | Di Giorgio | Oct. 18, 1949 |